(12) United States Patent
Park et al.

(10) Patent No.: US 12,424,127 B2
(45) Date of Patent: Sep. 23, 2025

(54) DISPLAY DEVICE

(71) Applicant: LG ELECTRONICS INC., Seoul (KR)

(72) Inventors: Yongnam Park, Seoul (KR); Kitae Kang, Seoul (KR); Jinha Heo, Seoul (KR); Dongheon Choi, Seoul (KR); Brian Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 18/565,764

(22) PCT Filed: Jun. 2, 2022

(86) PCT No.: PCT/KR2022/007827
§ 371 (c)(1),
(2) Date: Nov. 30, 2023

(87) PCT Pub. No.: WO2023/277366
PCT Pub. Date: Jan. 5, 2023

(65) Prior Publication Data
US 2024/0371300 A1    Nov. 7, 2024

(30) Foreign Application Priority Data
Jun. 28, 2021 (KR) .................. 10-2021-0084080

(51) Int. Cl.
*H01L 33/00* (2010.01)
*G09F 9/302* (2006.01)
*G09F 9/33* (2006.01)

(52) U.S. Cl.
CPC .............. *G09F 9/3026* (2013.01); *G09F 9/33* (2013.01)

(58) Field of Classification Search
CPC . G09F 9/3026; G09F 9/33; F16B 5/02; G02F 1/1333; G02F 1/13336
See application file for complete search history.

(56) References Cited

U.S. PATENT DOCUMENTS

2011/0204534 A1* 8/2011 Kanemasu ............. B29C 43/12
425/13
2011/0279959 A1* 11/2011 Lopez .................... A45F 5/00
361/679.03

(Continued)

FOREIGN PATENT DOCUMENTS

KR    10-2005-0099692 A    10/2005
KR    10-2016-0097599 A    8/2016

(Continued)

*Primary Examiner* — Amy J. Sterling
(74) *Attorney, Agent, or Firm* — Birch, Stewart, Kolasch & Birch, LLP

(57) ABSTRACT

Provided is a display module comprising: a display module; a fastening bracket which is disposed at the rear surface of the display module; a resin which couples the fastening bracket and the display module to each other; a module holder which is disposed at the rear surface of the display module; and a fastener which passes through the module holder in the direction from the rear to front of the module holder and is coupled to the fastening bracket, wherein when the fastener is decoupled from the fastening bracket, the module holder is separated from the display module.

14 Claims, 10 Drawing Sheets

(56) References Cited

U.S. PATENT DOCUMENTS

| | | | |
|---|---|---|---|
| 2014/0016302 A1* | 1/2014 | Shin | G09F 9/30 361/679.01 |
| 2020/0380895 A1 | 12/2020 | Nakano | |
| 2021/0050472 A1* | 2/2021 | Kim | H10H 20/01 |

FOREIGN PATENT DOCUMENTS

| | | |
|---|---|---|
| KR | 10-2019-0092968 A | 8/2019 |
| KR | 10-2019-0108665 A | 9/2019 |

\* cited by examiner (a)

(b)

(a)

(b)

(a)

(b)

(a)

(b)

(a)

(a)

DISPLAY DEVICE

CROSS REFERENCE TO RELATED APPLICATIONS

This application is the National Phase of PCT International Application No. PCT/KR2022/007827, filed on Jun. 2, 2022, which claims priority under 35 U.S.C. 119 (a) to Patent Application No. 10-2021-0084080, filed in the Republic of Korea on Jun. 28, 2021, all of these applications being hereby expressly incorporated by reference into the present application.

TECHNICAL FIELD

The present disclosure relates to a multi-display device.

BACKGROUND

Digital signage is a communication tool that can induce marketing, advertising, training effects and customer experience of companies. It is a display device that provides specific information as well as broadcast programs in public places such as airports, hotels, hospitals, and subway stations.

The digital signage is a medium that displays various content and commercial advertisements by installing display devices such as a liquid crystal display (LCD), a plasma display panel (PDP), and an organic light emitting diode (OLED) in outdoor certain places or street furniture. The digital signage can now be installed on all moving lines, where the public moves, such as apartment elevators, subway stations, subways, buses, universities, banks, convenience stores, discount stores, shopping malls.

When configuring a single screen using a plurality of display panels or display devices, the digital signage has a problem that a screen distortion occurs due to a difference in level between adjacent display panels in an up-down direction or in a left-right direction.

DETAILED DESCRIPTION

Technical Solution

One object of the present disclosure is to solve the above-mentioned problems and other problems. Another object of the present disclosure may be to provide a multi-display device capable of adjusting a height difference or a level difference between adjacent display modules.

Technical Solution

According to an aspect of the present disclosure, a display module includes a display module, a fastening bracket located on a rear surface of the display module, a resin coupling the fastening bracket and the display module to each other, a module holder located on the rear surface of the display module, and a fastener that passes forward through a rear surface of the module holder and coupled to the fastening bracket, wherein, when the fastener is separated from the fastening bracket, the module holder is separated from the display module.

A plurality of display modules may be fastened to the module holder, and the plurality of display modules may be arranged with front surfaces defining the same plane.

The plurality of display modules may include a first display module having a first thickness and a second display module having a second thickness greater than the first thickness, and an amount of a first resin of the first display module may be greater than an amount of a second resin of the second display module.

The display module may further include a fastening boss formed on the rear surface of the display module, the fastening bracket may include a nut inserted into the fastening boss, and the resin may be located in an empty space between the nut and the fastening boss.

A portion of the fastener, which protrudes to a front surface of the module holder, may be less than a thickness of the fastening bracket.

The display module may further include a stopper inserted into a front surface of the nut after the fastener and the nut are fastened to each other.

The display module may further include an elastic ring inserted between the fastening bracket and the module holder.

The display module may further include a resin hole formed in the fastening bracket, and an injection port formed in the module holder at a position corresponding to the resin hole, and the resin may be filed in the resin hole.

According to another aspect of the present disclosure, a method of assembling a display module includes accommodating a display module including a fastening boss formed on a rear surface of the display module, a front surface of the display module being in contact with an assembly table, inserting a fastener into a rear surface of a module holder and fastening a nut to an end of the fastener, which protrudes forward, injecting a resin into the fastening boss, and stacking the module holder on the rear surface of the display module to insert the nut into the fastening boss.

The plurality of display modules may be arranged in a grid, and the module holder may cover rear surfaces of the plurality of display modules and include fastening bosses of the plurality of display modules, a plurality of fasteners inserted thereinto, and nuts respectively inserted.

An injected amount of the resin may be adjusted depending on a thickness of the display module.

The fastener may be released from the nut to separate the display module, the resin, and the nut from the module holder, and another display module may be fastened to the module holder.

The other display module may include a fastening boss formed on a rear surface thereof and a nut inserted into the fastening boss, and the display module may further include an elastic ring disposed between the fastening boss or the nut and the module holder.

According to another aspect of the present disclosure, a method of assembling a display module includes accommodating a display module with a front surface being in contact with an assembly table, fastening a fastener passing through a module holder and coupling the fastening bracket to a front surface of the module holder, accommodating the fastening bracket and the module holder on a rear surface of the display module, and injecting a resin into a resin hole formed in the fastening bracket to couple the fastening bracket and the display module to each other, wherein the module holder further includes an injection port connected to the resin hole.

The plurality of display modules may be arranged in a grid, the module holder may cover rear surfaces of the plurality of display modules, and the display module may further include an elastic ring between the fastening bracket and the module holder.

Advantageous Effects

According to an embodiment of the present disclosure, a dimensional difference and assembly tolerance between panel modules may be compensated for using a resin, thereby reducing a step difference and a gap between display modules.

The step difference may be easily adjusted depending on the amount of injected resin, which may shorten an assembly time of the display module.

The display module may be easily separated from the module holder, which has an advantage of easy maintenance.

Additional scope of applicability of the disclosure will become apparent from the following detailed description. However, since various changes and modifications within the spirit and scope of the disclosure can be understood by those skilled in the art, it should be understood that specific embodiments, such as the detailed description and the preferred embodiments of the disclosure, are given as examples.

BEST MODE

Figure 1:
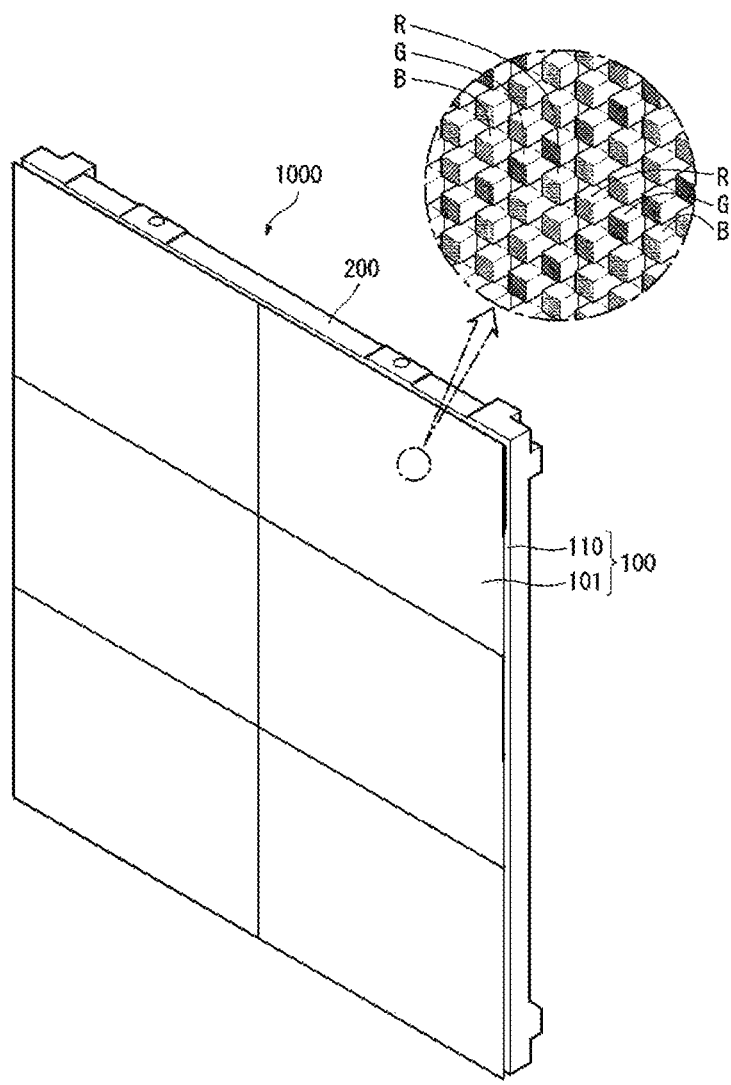
FIGS. 1 to 2 are diagrams showing examples of a display device according to an embodiment of the present disclosure.

Reference will now be made in detail embodiments of the disclosure examples of which are illustrated in the accompanying drawings. Since the present disclosure may be modified in various ways and may have various forms, specific embodiments are illustrated in the drawings and are described in detail in the present specification. However, it should be understood that the present disclosure are not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Hereinafter, the embodiments of the disclosure are described using a Light Emitting Diode (LED) panel as an example of a display panel. Other display panels may be used. For example, an organic light emitting diode (OLED) display panel, a plasma display panel (PDP), a field emission display (FED) panel, Liquid Crystal Display (LCD) and may be used.

Figure 2:
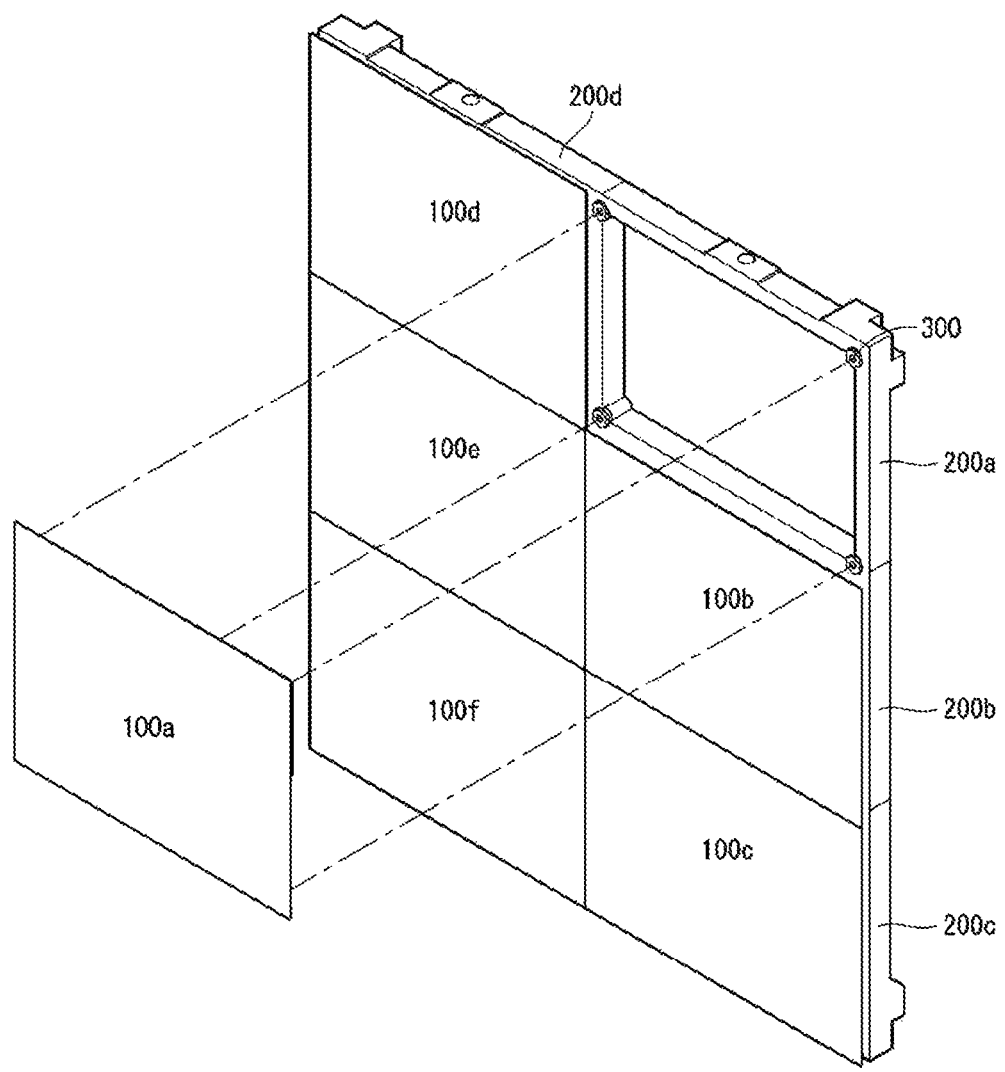

Referring to FIGS. 1 and 2, a multi-display device 1000 may include a display module 100 capable of displaying images, a frame 200 supporting the display module 100, and a displacement adjustment unit 300 mounted between the display module 100 and the frame 200 to adjust a distance therebetween.

The display module 100 may include a display panel 101 and a module cover 110 positioned behind the display panel 101.

The display panel 101 may include a plurality of pixels R, G, B. The plurality of pixels R, G, and B may be formed in each region where a plurality of data lines and a plurality of gate lines cross. The plurality of pixels R, G, B may be disposed or arranged in a matrix form.

For example, the plurality of pixels R, G, and B may include a red (R) sub-pixel, a green (G) sub-pixel, and a blue (B) sub-pixel. The plurality of pixels R, G, and B may further include a white (hereinafter, 'W') sub-pixel.

In the display panel 101, a side on which images can be observed may be referred to as a front side or a front surface. When the display panel 101 displays the images, a side on which the images cannot be observed may be referred to as a back side or a back surface. When looking at the display panel 101 from the front side or the front surface, an upper part may be referred to as an upper side or an upper surface. Similarly, a lower part may be referred to as a lower side or a lower surface. Similarly, a right part may be referred to as a right side or a right surface, and a left part may be referred to as a left side or a left surface.

The module cover 110 may be disposed behind the display panel 101 to protect the back surface of the display panel 101 from outside.

The display module 100 may include a first display module 100a to a sixth display module 100f. The first display module 100a to the sixth display module 100f may be arranged to be adjacent to each other in an up-down direction and a left-right direction.

For example, the first display module 100a may be disposed on an upper right side of the frame 200. The second display module 100b may be disposed below the first display module 100a. The third display module 100c may be disposed below the second display module 100b. The fourth display module 100d may be disposed on the left side of the first display module 100a. The fifth display module 100e may be disposed below the fourth display module 100d and on the left side of the second display module 100b. The sixth display module 100f may be disposed below the fifth display module 100e and on the left side of the third display module 100c.

The frame 200 may be disposed behind the plurality of display modules 100. A front surface of the frame 200 may face the back surface of the display module 100. The frame 200 may be disposed to correspond to the display module 100 in a thickness direction or a back-and-forth direction of the display module 100. The frame 200 may be formed in a frame shape in which a central region is opened. The frame 200 may be formed to be long in the up-down direction and the left-right direction so that the plurality of display modules 100 may be mounted. For example, a length of an upper side of the frame 200 may be substantially the same as a sum of a length of the upper side of the first display module 100a and a length of the upper side of the fourth display module 100d. A length of a right side of the frame 200 may be substantially the same as a sum of a length of the right side of the first display module 100a, a length of the right side of the second display module 100b, and a length of the right side of the third display module 100c. But it is not limited thereto. The frame 200 may be formed to be longer or shorter than the display module 100 according to an external environment such as a building or a wall to be installed.

The frame 200 may have a thickness greater than a thickness of the plurality of display modules 100.

Although one frame 200 is shown in FIGS. 1 and 2, but it is not limited thereto. The frame 200 may include a first frame 200a to a sixth frame 200f. For example, the first frame 200a to the sixth frame 200f may be stacked or assembled in substantially the same manner as the first display module 100a to the sixth display module 100f described above. Thus, the n-th display module 100 may be mounted on the n-th frame 200, where n may be a natural number.

The displacement adjustment unit 300 may be disposed between the plurality of display modules 100 and the frame 200. The displacement adjustment unit 300 may be mounted on the frame 200 in the thickness direction of the display module 100. The displacement adjustment unit 300 mounted on the front surface of the frame 200 may be attached to the back surface of the display module 100. The displacement adjustment unit 300 can adjust a distance between the back surface of the display module 100 and the front surface of the frame 200. The displacement adjustment unit 300 may be a plurality of displacement adjustment units. The displacement adjustment unit 300 may be disposed at each of corners of the frame 200. The displacement adjustment unit 300 may be disposed at each corner of the display module 100 and the frame 200, and can adjust the distance therebetween.

Figure 3:
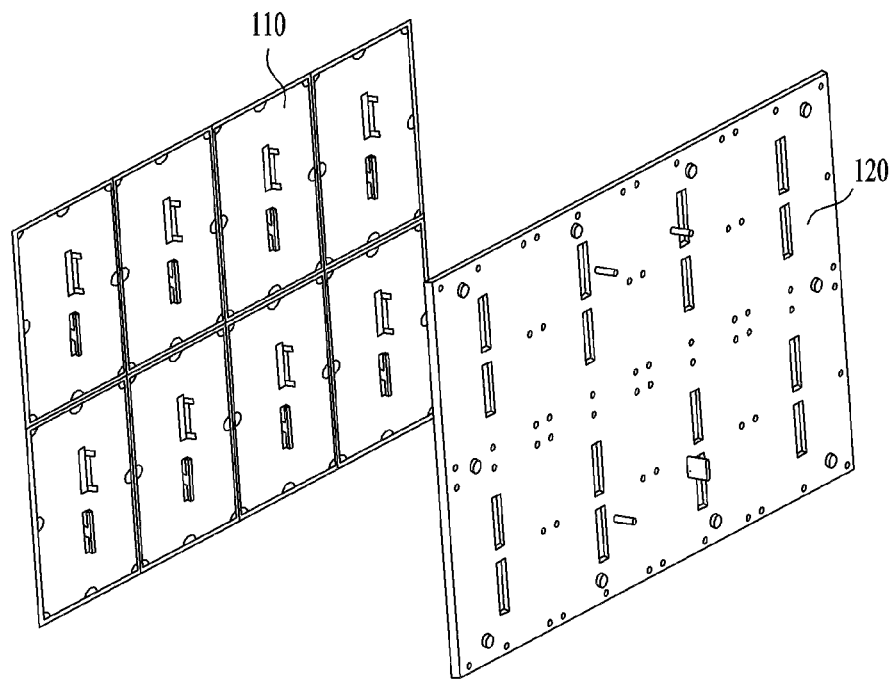
FIG. 3 is a diagram showing a structure of a display module according to an embodiment.
Figure 3:
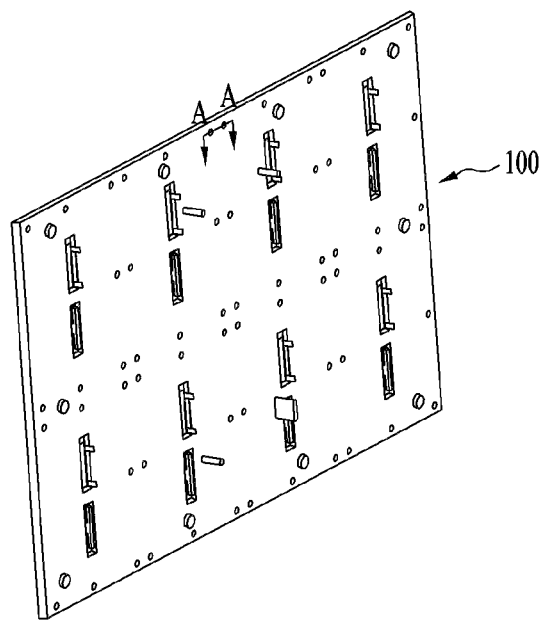

FIG. 3 is a diagram showing a structure of a display module according to an embodiment. A plurality of display modules may be arranged in a grid and coupled to a front surface of a module holder 120. The module holder 120 may combine the plurality of display modules 110 to form one display module, and a rear surface of the module holder 120 may be combined with a frame to implement a large display device.

A fastening hole 123 through which a fastener 130 passes may be formed in the module holder 120 to be coupled to each of the display modules 110. The fastener 130 may be fastened to a rear surface of the display module 110 located on a front surface of the module holder 120 by inserting a member such as a screw into the rear surface of the module holder 120.

Figure 4:
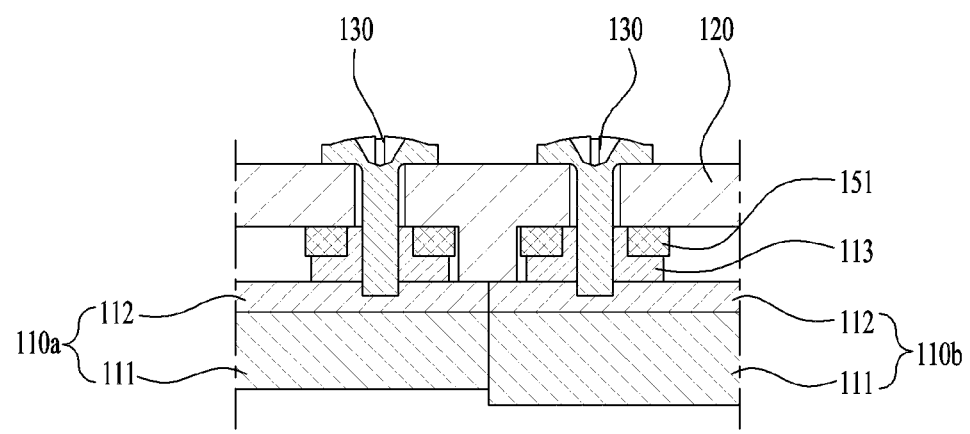
FIG. 4 is a cross-sectional view taken along line A-A of FIG. 3.
Figure 4:
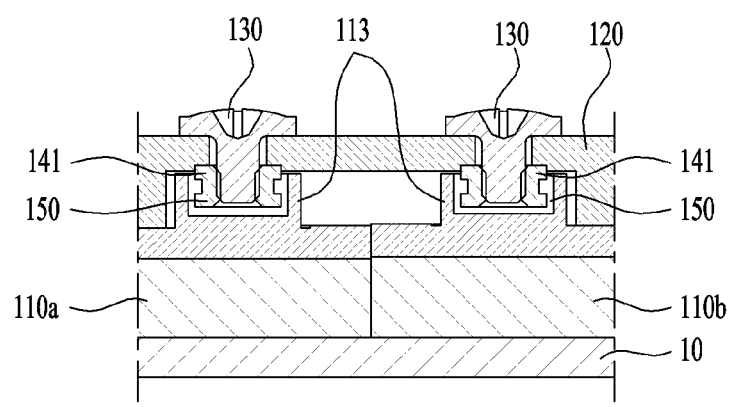

FIG. 4 is a cross-sectional view taken along line A-A of FIG. 3, and according to an embodiment of (a) of FIG. 4, the display module 110 includes a light emitting panel 111 from which an image is output and a panel plate 112 located on a rear surface of the light emitting panel 111. Includes plate 112. The light emitting panel 111 and the panel plate 112 may be adhered to each other using an adhesive tape or the like and the fastener 130 may be coupled to a fastening boss 113 formed on the rear surface of the panel plate 112 to fix the display module 110 to the module holder 120.

The fastening boss 113 located on the rear surface of the display module 110 may include a groove portion to which the fastener 130 is coupled, and an end of the fastener 130 may be coupled to the groove portion. When a screw formed in a helix shape is used as the fastener 130, the amount of fastening of the fastener 130 to the fastening boss 113 may be adjusted by the amount of rotation, and thus an interval between the display module 110 and the panel plate 112 may be adjusted. However, when the fastener 130 is nor firmly fastened, the display modules 110 may be unstably fixed, and thus the display modules 110 may shake or a gap therebetween may be generated, and the display modules 110 may fall.

Alternatively, an elastic ring 151 may be interposed between the fastening boss 113 and the module holder 120 to compensate for a thickness difference between the display modules 110 through the elasticity of the elastic ring 151. The elastic ring 151 is a ring-shaped member using a material such as silicon. When pressure is applied, the volume of the elastic ring 151 decreases and a friction coefficient is large, which has an effect of increasing a fastening force between the fastening boss 113 and the module holder 120. However, a step difference to be compensated by a silicon ring is limited, and as a result, a coupling force between the fastener 130 and the fastening boss 113 varies for each of the display modules 110, and thus the above-mentioned problems are limited but still remain.

To resolve the above problem, as shown in (b) of FIG. 4, the display module 110 and the module holder 120 may be fastened using a resin 150. The Resin 150 may be used to fill an empty space or adhere two members to each other by hardening paste or a liquid material.

Figure 5:
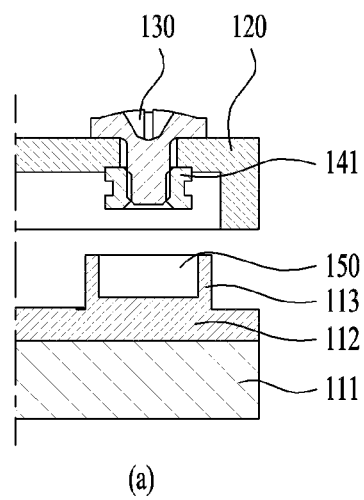
FIGS. 5 and 6 are diagrams showing a method of fastening a display module and a module holder to each other according to an embodiment of (b) of FIG. 4.
Figure 5:
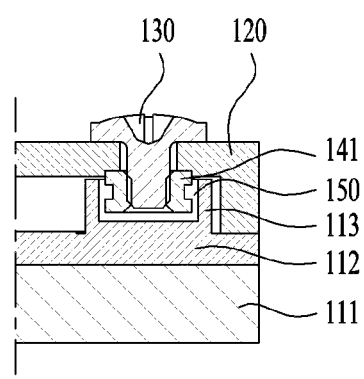
Figure 6:
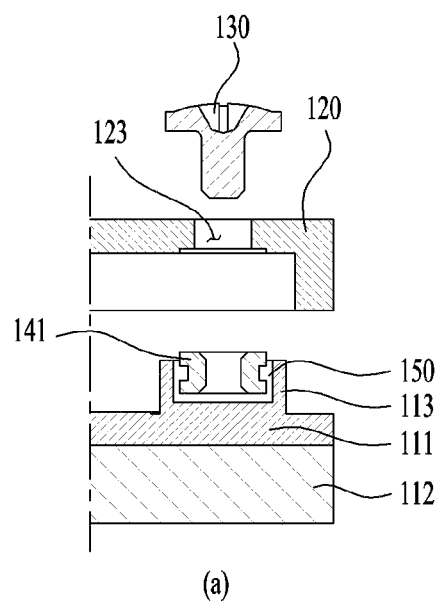
Figure 6:
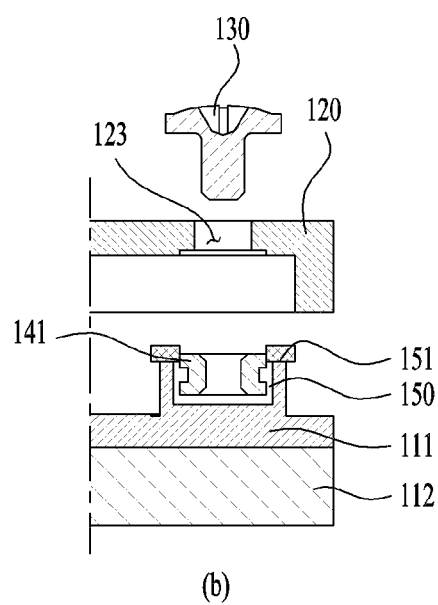

As shown in (b) of FIG. 4, a first display module 110a and a second display module 110b have different thicknesses. This thickness difference may be compensated for by adjusting the amount of resin injected between the display module 110 and the module holder 120. FIGS. 5 and 6 are diagrams illustrating a method of fastening the display module 110 and the module holder 120 according to the embodiment of (b) of FIG. 4.

Referring to (a) of FIG. 5, the fastening boss 113 located on the rear surface of the display module 110 may be integrated with the panel plate 112, and the fastening boss 113 may include a well-shaped receiving portion and protrude toward the rear surface.

Front surfaces of the plurality of the display modules 110 may be placed in contact with a flat surface of an assembly table. In the case of this arrangement, the front surfaces of the display modules 110 may define the same plane, but when the thicknesses of the display modules 110 are different from each other, the heights of the rear surfaces thereof may be different from each other. The height difference of the rear surfaces may be compensated for using the resin 150.

The fastener 130, which passes through the fastening hole 123 formed in the module holder 120, is coupled to a fastening bracket 141 located in the front surface of the module holder 120. In the present embodiment, the fastener 130 may be a screw and the fastening bracket 141 may be a nut. A helical hole having a helix corresponding to the helix formed in the fastener 130 may be formed in the fastening bracket 141, and the fastening bracket 141, the fastener 130, and the module holder 120 may be maintained combined into one module.

When the amount of the resin 150 injected into the fastening boss 113 is excessively large, the resin 150 may overflow and may be attached to the module holder 120. An appropriate amount of the resin 150 may be injected by calculating the amount that does not overflow from the fastening boss 113 and may be configured differently depending on the thickness of the display module 110 to be attached.

As shown in (b) of FIG. 5, the nut coupled to the screw may be inserted into the fastening boss 113, and the resin 150 injected into the fastening boss 113 may be filled in an empty space between the fastening boss 113 and the nut, and thus the nut and the fastening boss 113 may be coupled to each other. To expand an area in which the resin 150 is attached to the nut, the fastening boss 113 holds the resin 150 in a position corresponding to the fastening bracket 141 without spreading.

The injected amount of the resin 150 may be adjusted by omitting the fastening boss 113 and applying the resin 150 directly to the rear surface of the display module 110 or forming an opening in the module holder 120 and disposing the module holder 120 on the rear surface of the display module 110 to inject the resin 150.

The length of the screw may be adjusted such that the resin 150 is attached to the fastening bracket 141 and the nut and is not in contact with the fastener 130 and the screw. A length by which the screw protrudes to the front surface of the module holder 120 may be made to be less than the thickness of the nut to prevent the screw from protruding forward compared with the nut.

The nut may be opened only in a direction in which the screw is inserted to prevent the resin 150 from flowing into the nut and causing direct contact between the screw and the resin 150. To block an opposite side of the nut to the direction in which the screw is inserted, a stopper may be used to block the nut after the screw and the nut are assembled.

FIG. 6 is a diagram illustrating a method of separating and replacing the coupled display module 110 for maintenance. Referring to (a) of FIG. 6, when the fastener 130 is separated from the fastening bracket 141, the fastener 130, the module holder 120, and the fastening bracket 141 are separated. The fastening bracket 141 is attached to the rear surface of the display module 110 through the resin 150 and is separated together with the display module 110.

When the display module 110 is reassembled after repair, the height of the front surface of the display module 110 remains the same, but when the display module 110 is replaced, the thickness may be different from the previous display module 110. (b) of FIG. 6 is a diagram showing a method of coupling the display module 110 to the module holder 120. The replaced display module 110 in a state in which the fastening bracket 141 is coupled to the rear surface of the display module 110 using the resin 150 may be used.

To compensate for a thickness difference between the existing display module 110 and the replaced display module 110, an error may be compensated for using the elastic ring 151 as shown in (b) of FIG. 6.

Alternatively, as shown in FIG. 5, the fastening bracket 141 may be coupled to the fastener 130 that passes through a fastening module, the resin 150 may be injected into the fastening boss 113 of the replaced display module 110, and then the display module 110 may be coupled to the module holder 120 to compensate for the height difference.

However, as described above, in this method, the plurality of the display modules 110 are not assembled in a state of being held on a flat plane, and thus it is difficult to fix the display modules 110 during a hardening time of the resin 150, and thus as shown in FIG. 6, it may be easy to perform maintenance using the elastic ring 151.

Figure 7:
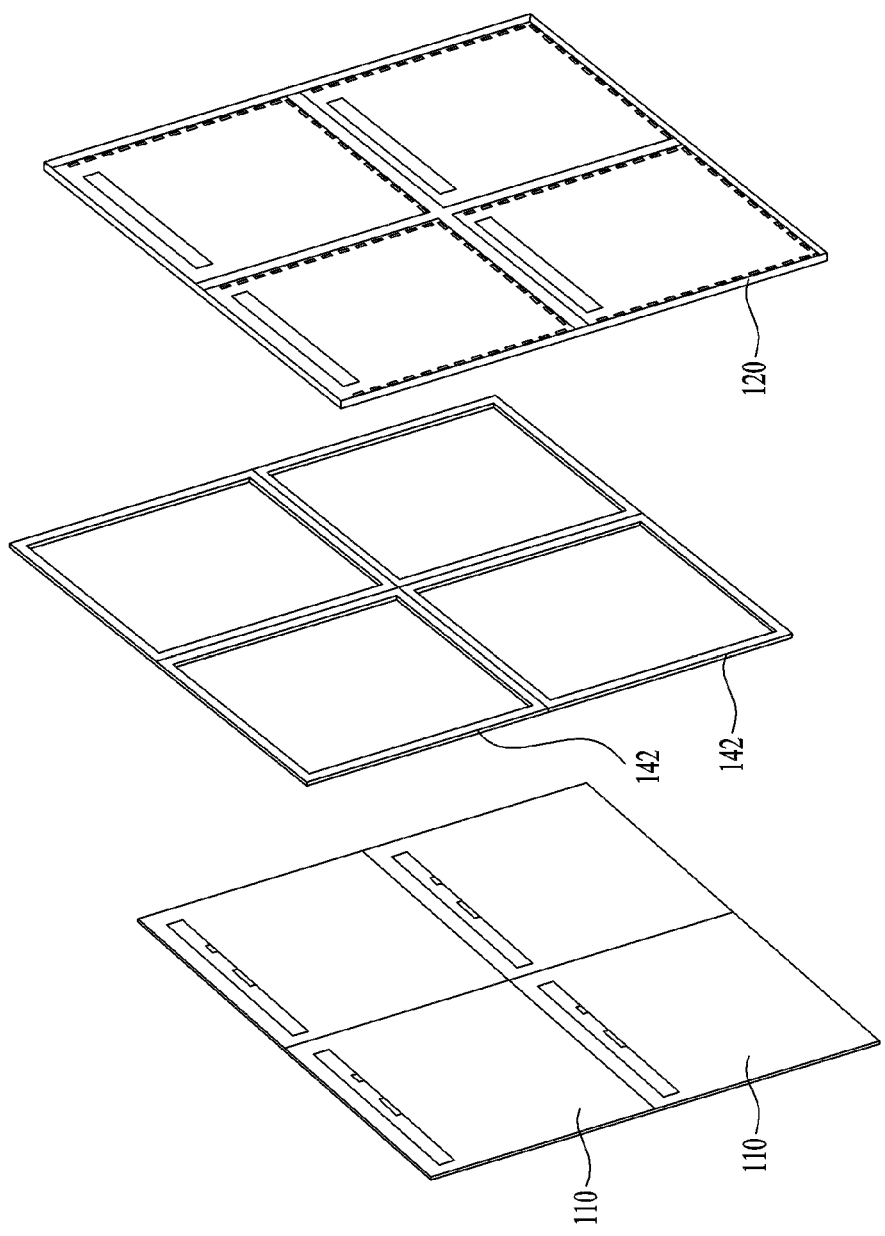
FIG. 7 is a diagram showing a structure of a display module according to another embodiment.

FIG. 7 is a diagram showing the structure of a display module according to another embodiment and shows the display modules 110, a fastening bracket 142, and the module holder 120. The structure may include four display modules 110, four fastening brackets 142 located on the rear surfaces of the display modules 110, and the module holder 120 located on the rear surface of the fastening bracket 142. The number of the display modules 110 and the fastening brackets 142 is not limited to four, and more or fewer may be coupled to one piece of the module holder 120.

In the drawing, the fastening brackets 142 may be positioned around the rear surface of the display modules 110 in a shape of a picture frame, but is not necessarily limited thereto, and may also be positioned across the middle of the display modules 110.

Figure 8:
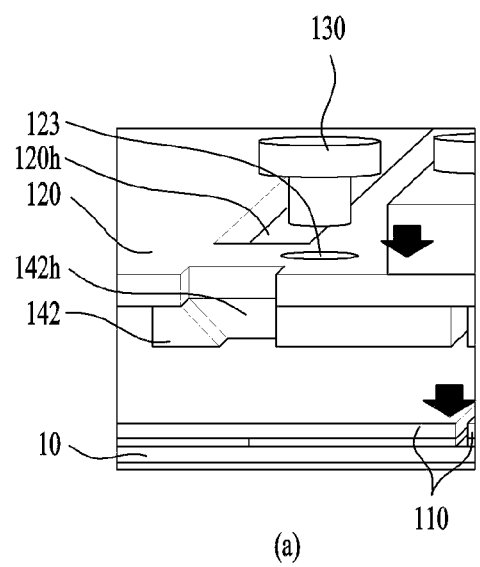
FIGS. 8 to 10 are diagrams showing a method of fastening a display module and a module holder according to the embodiment of FIG. 7.
Figure 8:
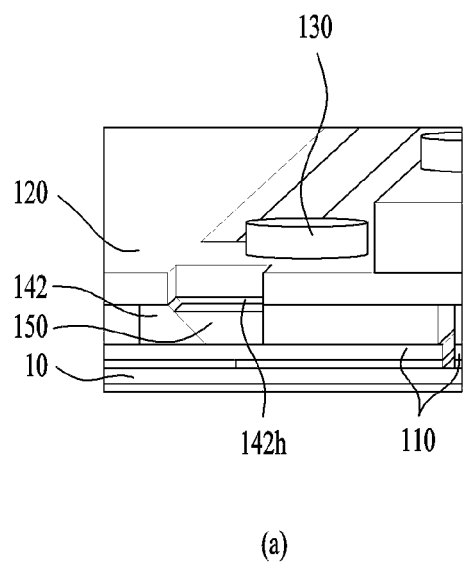
Figure 9:
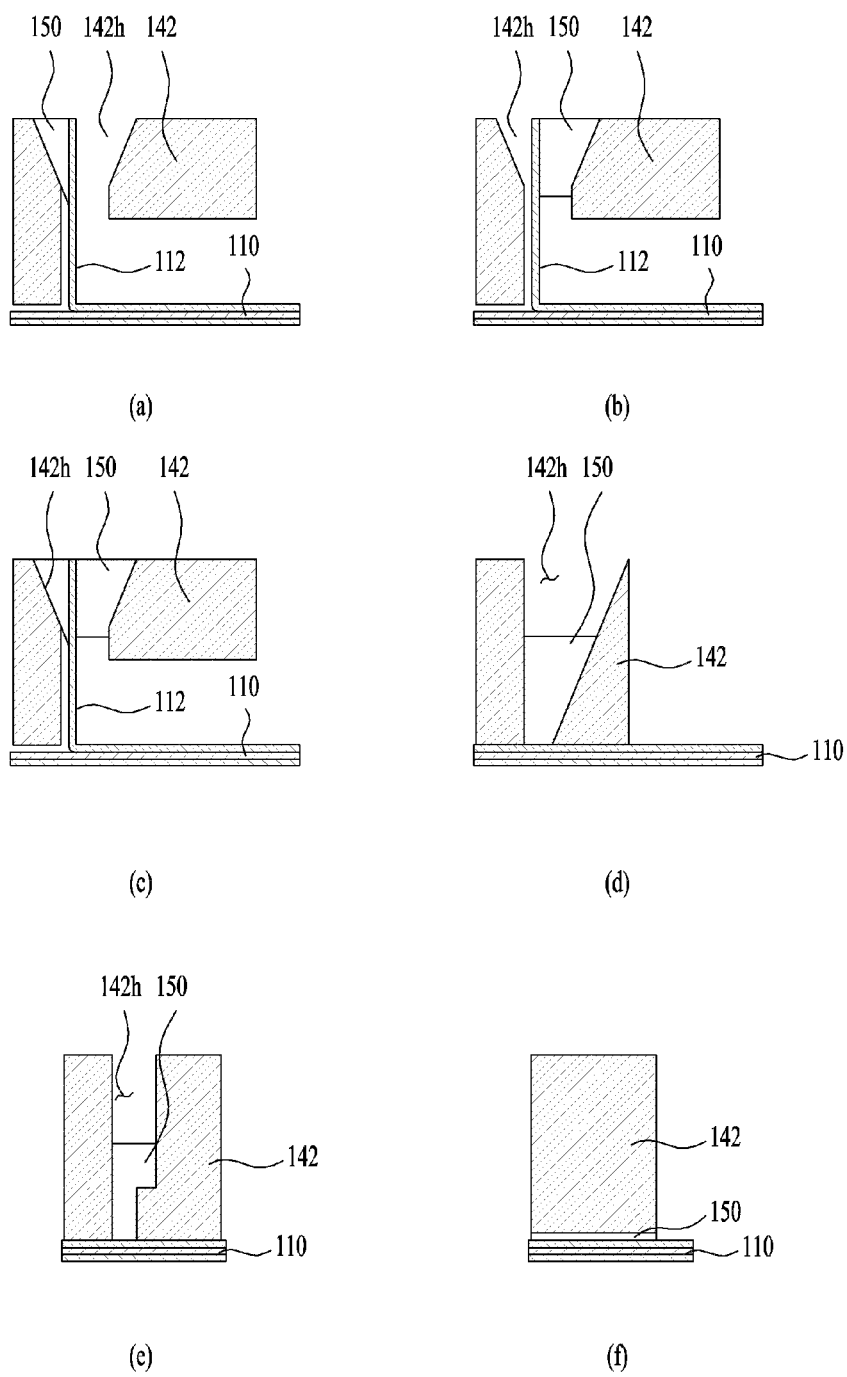
Figure 10:
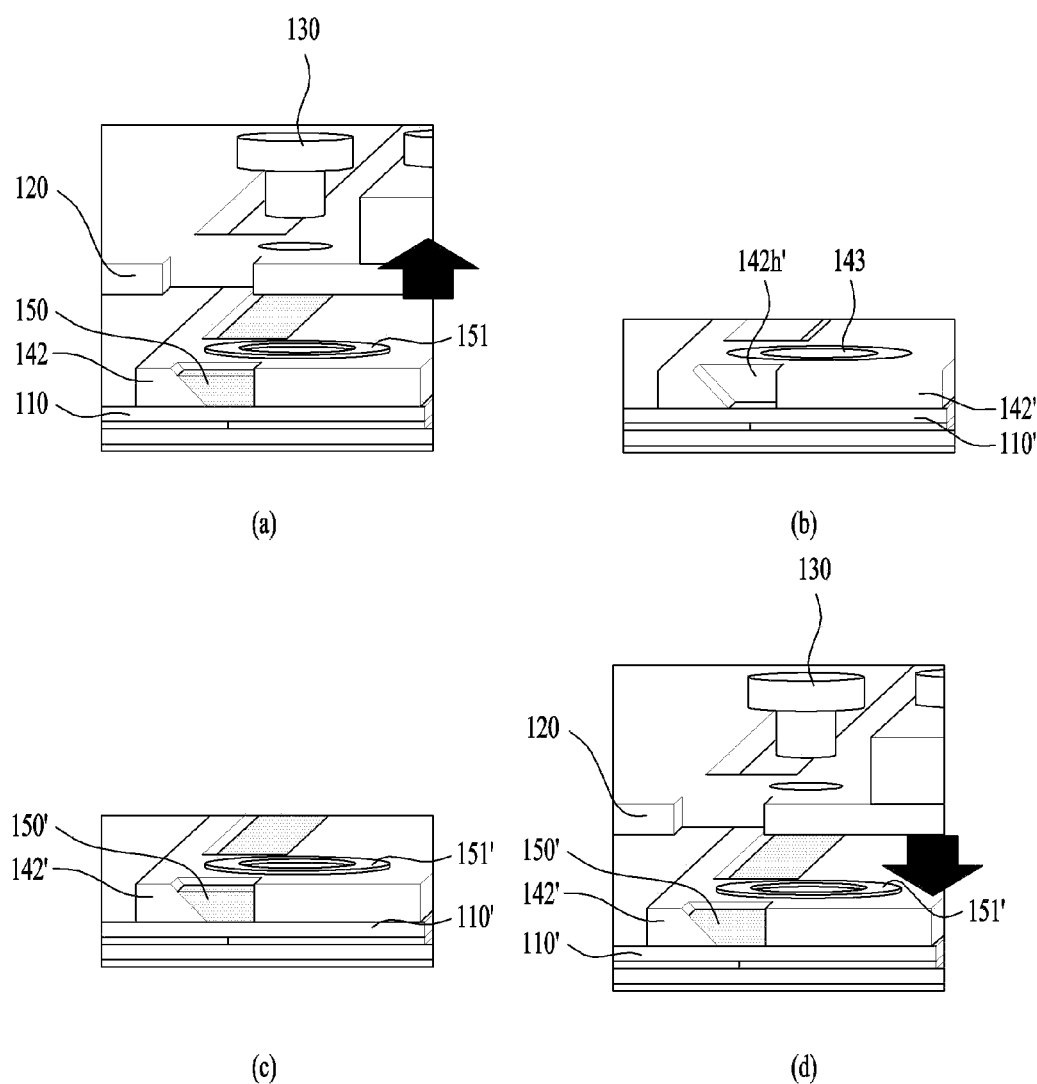

FIGS. 8 to 10 are diagrams showing a method of fastening the display module 110 and the module holder 120 according to the embodiment of FIG. 7.

The module holder 120 may include an injection port 120*h* formed at a position corresponding to the fastening bracket 142, and the fastening bracket 142 may include a resin hole 142*h* that communicates with the injection port 120*h* and through which the display module 110 are exposed. As shown in (a) of FIG. 8, the fastening bracket 142 and the module holder 120 are coupled to each other through the fastener 130 and may be stacked on the rear surface of the display module 110.

Then, the resin 150 is injected into the resin hole 142*h* through the injection port 120*h* and hardened in the resin hole 142*h* to couple the fastening bracket 142 and the display module 110 to each other. When the thickness of the display module 110 is small, a separation space is formed between the display module 110 and the fastening bracket 142 may be formed, and the resin 150 may be injected into the separation space, thereby compensating for the step difference between the display modules 110.

Alternatively, to compensate the step difference between the display modules 110, when the fastener 130 is fattened to the fastening bracket 142, the elastic ring 151 may be interposed between the fastening bracket 142 and the module holder 120.

The injection port 120*h* is an opening for injecting the resin 150 into the resin hole 142*h* when the fastening bracket 142 and the module holder 120 are coupled to each other, and the injection port 120*h* is not filled with the resin 150. When the injection port 120*h* is filled with the resin 150, the module holder 120 and the fastening bracket 142 are coupled to each other by the resin 150, and thus even if the fastener 130 is removed, the fastening bracket 142 and the module holder 120 may not be separated.

FIG. 9 is a diagram showing various fastening methods of the resin hole 142*h* and the display module 110. When an end of the panel plate 112 located on the rear surface of the display module 110 is bent to protrude toward the rear surface, the resin hole 142*h* may be located at a position corresponding to the bent portion as shown in (a) to (c) of FIG. 9.

When resin 150 is injected to the resin hole 142*h*, the panel plate 112 inserted into the resin hole 142*h* may be coupled to the fastening bracket 142 through the resin 150. As shown in (a) and (b) of FIG. 9, the resin 150 may be partially injected into the resin hole 142*h* and as shown in (c) of FIG. 9, the resin 150 may be entirely injected into the resin hole 142*h*.

As shown in (d) to (f) of FIG. 9, when the panel plate 112 has a flat shape rather than being inserted into the resin hole 142*h*, the fastening bracket 142 and the display module 110 may be coupled to each other through the resin 150 in contact with the rear surface of the panel plate 112 and the internal surface of the resin hole 142*h*.

To increase a fastening force, a shape of the resin hole 142*h* may has a step difference as shown in (e) of FIG. 9, and when the resin hole 142*h* is not present but the fastening bracket 142 and the display module 110 are thin and a gap is present between the display module 110 and the fastening bracket 142, the resin 150 may flow into the gap to couple the display module 110 and the fastening bracket 142 to each other as shown in (f) of FIG. 9.

FIG. 10 is a diagram showing a method of separating the display module 110 for maintenance and coupling the replaced display module 110 to the module holder 120. The fastener 130 is separated from the fastening bracket 142 to separate the display module 110 and the module holder 120 from each other. The module holder 120 together the display module 110 is separated from the module holder 120 in a state of being coupled to the display module 110 through the resin 150 injected into the resin hole 142*h*.

As shown in (b) of FIG. 10, the fastening bracket 142 is located on the rear surface of the replaced display module 110, and as shown in (c) of FIG. 10, the resin 150 is injected to couple the display module 110 and the fastening bracket 142 to each other. If necessary for step compensation, the elastic ring 151 may be inserted between the fastening bracket 142 and the module holder 120. The elastic ring 151 may be located around a fastening hole 143 into which the fastener 130 is inserted to control the fastening amount of the fastener 130.

When the resin 150 hardens, the display module 110 may be replaced by disposing the display module 110 in the module holder 120 and coupling the display module 110 to the module holder 120 as shown in (d) of FIG. 10.

According to the present embodiment, unlike the previous embodiment, the fastening boss 113 is omitted, and instead, the fastening bracket 142 is large in size and the resin hole 142*h* is provided in the fastening bracket 142 to inject the resin 150 into the resin hole 142*h* later, but in both embodiments, the fastening bracket 142 may be coupled to the rear surface of the display module 110 through the resin 150 and the step difference between the display modules 110 may be eliminated by adjusting the injection amount of the resin 150.

The display module 110 and the module holder 120 may be coupled to each other using the resin 150 alone without the fastener 130 and the fastening bracket 142, but in this case, it is difficult to separate the display module 110 from the module holder 120. When the display module 110 and the module holder 120 are integrated, if one display module 110 is defective, the plurality of the display modules 110 coupled to the module holder 120 need to be replaced at the same time, thereby increasing maintenance costs.

The present disclosure may minimize the step difference between the display modules 110 while considering ease of maintenance using the fastening bracket 142 and the resin 150.

The above detailed description needs not be construed to be restrictive in any aspect and needs to be considered illustrative. The scope of the present disclosure needs to be determined by reasonable interpretation of the appended claims, and all changes within the equivalent scope of the present disclosure are included in the scope of the present disclosure.

The invention claimed is:

1. A display device comprising:
a display module including a fastening bracket located on a rear surface of the display module;
a resin coupling the fastening bracket and the display module to each other;
a module holder located on the rear surface of the display module; and
a fastener that passes forward through a rear surface of the module holder and coupled to the fastening bracket,
wherein, when the fastener is separated from the fastening bracket, the module holder is separated from the display module,
wherein a plurality of display modules are fastened to a front surface of the module holder,
wherein the plurality of display modules include a first display module having a first thickness and a second display module having a second thickness greater than the first thickness, and
wherein an amount of a first resin of the first display module is greater than an amount of a second resin of the second display module.

2. The display device of claim 1,
wherein the plurality of display modules are arranged with front surfaces defining a same plane.

3. The display device of claim 1, further comprising a fastening boss formed on the rear surface of the display module,
wherein the fastening bracket includes a nut inserted into the fastening boss, and
the resin is located in an empty space between the nut and the fastening boss.

4. The display device of claim 3, wherein a portion of the fastener, which protrudes to the front surface of the module holder, is less than a thickness of the fastening bracket.

5. The display device of claim 3, further comprising a stopper inserted into a front surface of the nut after the fastener and the nut are fastened to each other.

6. The display device of claim 1, further comprising an elastic ring inserted between the fastening bracket and the module holder.

7. The display device of claim 1, further comprising:
a resin hole formed in the fastening bracket; and
an injection port formed in the module holder at a position corresponding to the resin hole,
wherein the resin is filed in the resin hole.

8. A method of assembling a display device, the method comprising:
accommodating a display module including a fastening boss formed on a rear surface of the display module, a front surface of the display module being in contact with an assembly table;
inserting a fastener into a rear surface of a module holder and fastening a nut to an end of the fastener, which protrudes forward;
injecting a resin into the fastening boss; and
stacking the module holder on the rear surface of the display module to insert the nut into the fastening boss.

9. The method of claim 8, wherein a plurality of display modules are arranged in a grid, and
the module holder covers rear surfaces of the plurality of display modules and includes fastening bosses of the plurality of display modules, a plurality of fasteners inserted thereinto, and nuts respectively inserted.

10. The method of claim 9, wherein an injected amount of the resin is adjusted depending on a thickness of the display module.

11. The method of claim 8, wherein the fastener is released from the nut to separate the display module, the resin, and the nut from the module holder, and another display module is fastened to the module holder.

12. The method of claim 11, wherein the another display module includes a fastening boss formed on a rear surface thereof and a nut inserted into the fastening boss, and the display module further includes an elastic ring between the fastening boss or the nut and the module holder.

13. A method of assembling a display device, the method comprising:

accommodating a display module with a front surface being in contact with an assembly table;

fastening a fastener passing through a module holder and coupling a fastening bracket to a front surface of the module holder;

accommodating the fastening bracket and the module holder on a rear surface of the display module; and injecting a resin into a resin hole formed in the fastening bracket to couple the fastening bracket and the display module to each other, wherein the module holder further includes an injection port connected to the resin hole.

14. The method of claim 13, wherein a plurality of display modules are arranged in a grid, the module holder covers rear surfaces of the plurality of display modules, and the display module further includes an elastic ring between the fastening bracket and the module holder.

\* \* \* \* \*